United States Patent
Yoshino et al.

(10) Patent No.: US 7,372,621 B2
(45) Date of Patent: May 13, 2008

(54) WAVELENGTH CONVERTING DEVICES

(75) Inventors: Takashi Yoshino, Aichi-Pref. (JP);
Shoichiro Yamaguchi, Ichinomiya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/717,588

(22) Filed: Mar. 13, 2007

(65) Prior Publication Data

US 2007/0237481 A1    Oct. 11, 2007

(30) Foreign Application Priority Data

Mar. 20, 2006    (JP)    ............................. 2006-076891

(51) Int. Cl.
*G02F 2/02*    (2006.01)
(52) U.S. Cl. .................... 359/326; 359/328; 385/122
(58) Field of Classification Search ................ 385/122; 359/326, 328, 329, 332
See application file for complete search history.

(56) References Cited

U.S. PATENT DOCUMENTS 5,866,200 A    2/1999 Yoshino et al.

2001/0055453 A1*    12/2001 Mizuuchi et al. ........... 385/122

FOREIGN PATENT DOCUMENTS

JP    09-269430    10/1997

OTHER PUBLICATIONS

U.S. Appl. No. 11/682,557, filed Mar. 6, 2007, Yoshino et al.
U.S. Appl. No. 11/682,557 filed Mar. 6, 2007, Yoshino et al.

* cited by examiner

*Primary Examiner*—Hemang Sanghavi
(74) *Attorney, Agent, or Firm*—Burr & Brown (57) ABSTRACT

A wavelength converting device 1 has a ferroelectric layer 6 made of a ferroelectric material. The ferroelectric layer has a wavelength converting portion A having a ridge-type optical waveguide 7, additional portions A and B provided in both sides of the wavelength converting portions, respectively, and groove-forming portions C and D between the wavelength converting portion and the additional portions, respectively. The device further has a supporting body 2 adhered to a back face 6f of the ferroelectric layer 6, and back side metal films 5A and 5B covering at least a part of a back face 6f of the additional portions 6, respectively. The back side metal film 5A or 5B does not cover the back face 6f of the wavelength converting portion 6.

10 Claims, 7 Drawing Sheets

WAVELENGTH CONVERTING DEVICES

BACKGROUND ARTS

1. Field of the Invention

The invention relates to a wavelength converting device.

2. Background Arts

Non-linear optical crystals, such as lithium niobate or lithium tantalite, have a high second-order non-linear optical constant. It is thus possible to realize a quasi-phase matched (QPM) type second harmonic generation (SHG) device, by providing a periodic polarization domain inversion structure in the crystal. Further, an SHG device of a high efficiency can be realized by forming a waveguide in the periodic polarization domain inversion structure. Such device finds a wide variety of applications such as optical communication, medical uses, optochemical uses, various optical measurements, etc.

The applicant disclosed a process of producing a ridge-shaped optical waveguide used for a device for generating second harmonic wave, in Japanese Patent publication H09-269430A. The waveguide is formed by subjecting an oxide single crystal to ablation working using an excimer laser. Such oxide single crystal includes lithium niobate and lithium niobate-lithium tantalate solid solution.

SUMMARY OF THE INVENTION

The applicants have studied practical applications of such kinds of second harmonic wave oscillating devices. During the stage of practical applications, they have collimated blue or ultra-violet laser beam (second harmonic wave) to successfully obtain the profile beam for the subsequent analysis. The profile beam was shown in FIG. 7, for example.

Figure 7:
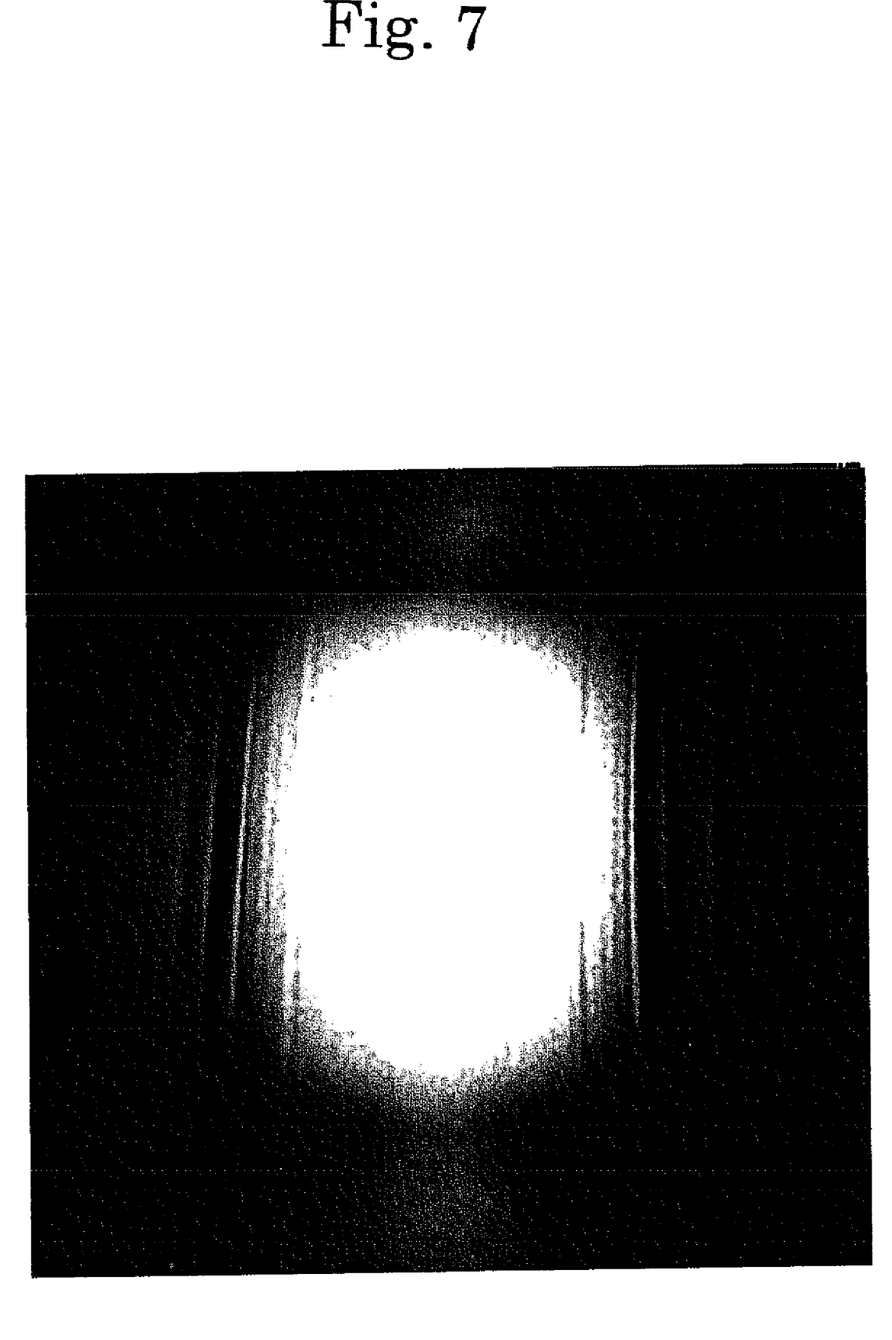
FIG. 7 is a photograph showing patterns of both of high spatial frequency and low spatial frequency in beam.

According to the profile beam, patterns of low spatial frequency were observed in the upper and lower sides of the main beam in perpendicular view. These are generated due to leakage of light from an optical waveguide to the upper and lower sides. The patterns of low spatial frequency are distant from the main beam in the upper and lower sides, so that they can be easily cut off to avoid a reduction of the intensity of the main beam.

On the other hand, patterns of high spatial frequency were observed in horizontal direction in the profile beam. This is due to leakage from the ridge-type optical waveguide to slab-type optical waveguides provided in both sides thereof. There is a large difference of refractive indices between a ferroelectric layer and an adhesive layer, so that the leaked light is prevented from the irradiation into a substrate, thus propagates through the slab portions and is irradiated from the end faces. Such patterns of high spatial frequency are superimposed onto the main beam, so that it is difficult to separate and remove the patterns. The intensity of the main beam is considerably lowered after the separation and removal of the patterns. The quality of the beam is thus deteriorated.

An object of the present invention is to improve the quality of beam of converted light after the conversion of wavelength.

A first invention provides a wavelength converting device comprising:

a ferroelectric layer comprising a ferroelectric material, said ferroelectric layer comprising a wavelength converting portion comprising a ridge-type optical waveguide, additional portions provided in both sides of said wavelength converting portion, respectively, and groove-forming portions provided between said wavelength converting portion and said additional portions, respectively;

a supporting body adhered to a back side of said ferroelectric layer; and a back side metal film covering at least a part of a back face of said additional portion, wherein said back side metal film does not cover a back face of said wavelength converting portion.

Further, a second invention provides a wavelength converting device comprising:

a ferroelectric layer comprising a ferroelectric material, said ferroelectric layer comprising a wavelength converting portion comprising a ridge-type optical waveguide, additional portions provided in both sides of said wavelength converting portion, respectively, and groove-forming portions between said wavelength converting portion and said additional portions, respectively;

a supporting body adhered to a back side of said ferroelectric layer; and a upper side metal film covering at least a part of a upper face of said additional portion, wherein said upper side metal film does not cover a upper face of said wavelength converting portion.

The inventors have variously studied the patterns of high spatial frequency in horizontal direction contained in wavelength-converted light. It was thus found that such patterns can be considerably reduced and quality of beam can be improved by covering at least a part of the back face of the additional portion with the back side metal film. The present invention is based on the discovery. However, in the case that the back face of the wavelength converting portion is covered with the back side metal film, light propagating in the wavelength converting portion would be absorbed by it to lower the output power. The back face of the wavelength converting portion is thus not covered.

Further, according to the second invention, it was found that the patterns of high spatial frequency in a horizontal direction can be considerably reduced and quality of beam can be improved by covering at least a part of the upper face of the additional portion with the upper side metal film. The present invention is based on the discovery. However, in the case that the upper face of the wavelength converting portion is covered with the upper side metal film, light propagating in the wavelength converting portion would be absorbed by it to lower the output power. The upper face of the wavelength converting portion is thus not covered.

PREFERRED EMBODIMENTS OF CARRYING OUT THE INVENTION

According to a preferred embodiment, at least a part of a back face of the groove-forming portion may be covered with the back side metal film. Further, it is preferred that the upper face of the groove-forming portion is not covered with the metal film.

According to a preferred embodiment, it is provided a back side buffer layer covering the back face of the ferroelectric layer and the back side metal film. It is thus possible to further improve the output of the converted light.

Further, according to a preferred embodiment, it is provided a upper side buffer layer covering both of the upper face of the additional portion and the upper side metal film. It is thus possible to further improve the output of the converted light.

The present invention will be described further in detail referring to the drawings.

Figure 1:
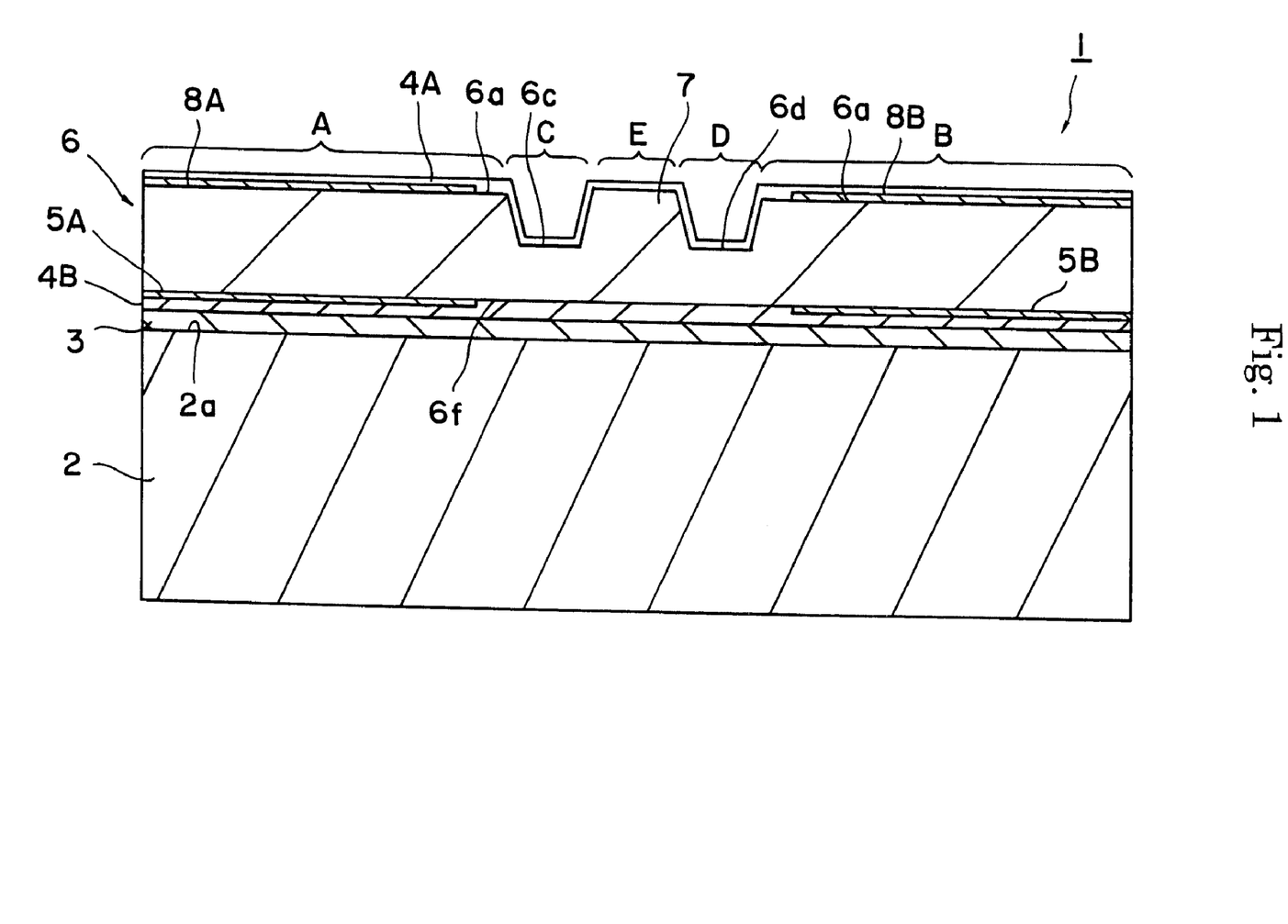
FIG. 1 is a cross sectional view schematically showing a device 1 according to one embodiment of the present invention.
Figure 2:
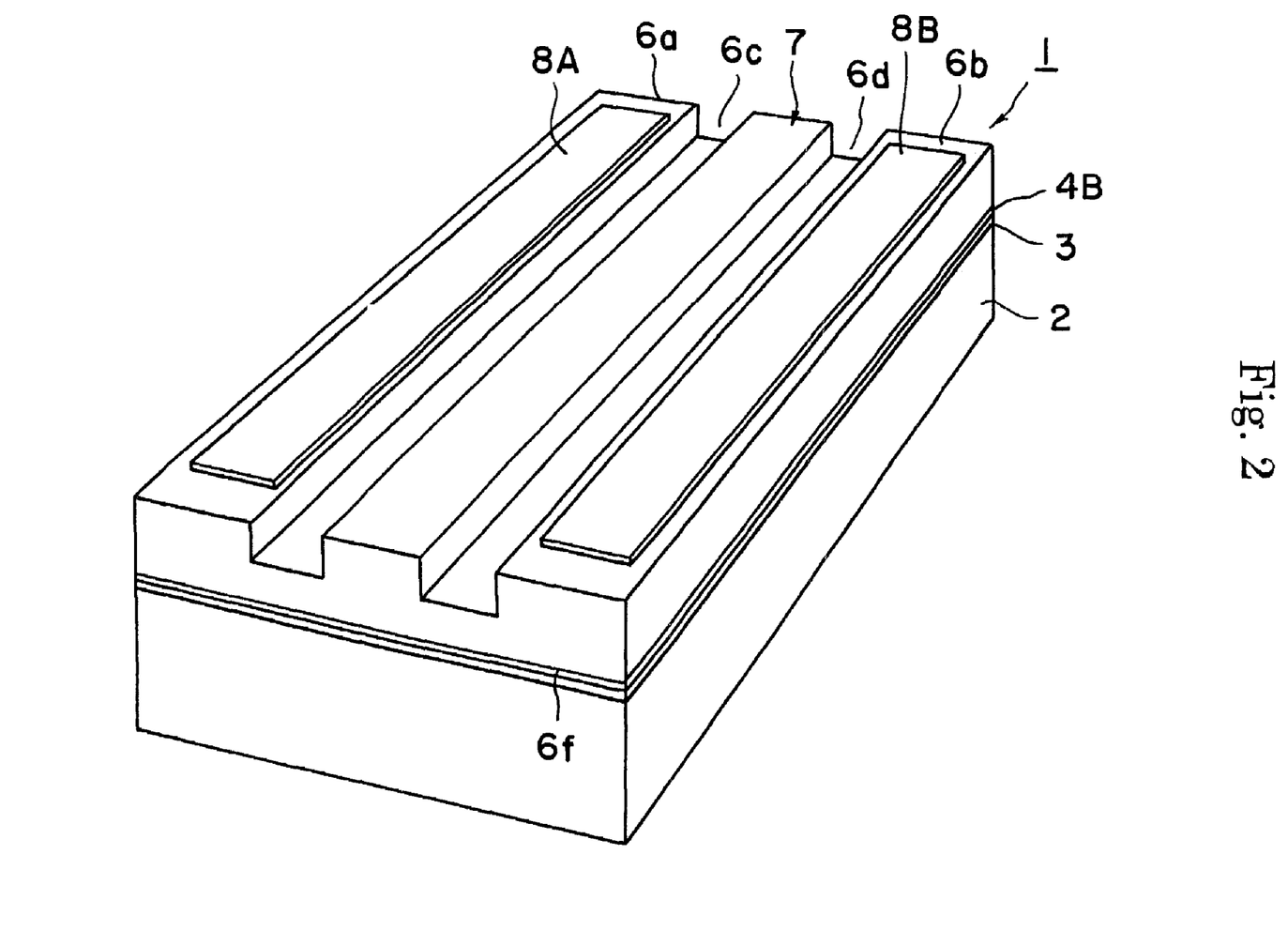
FIG. 2 is a perspective view schematically showing the device 1 of FIG. 1.

FIG. 1 is a cross sectional view schematically showing a wavelength converting device 1 according to one embodiment of the present invention. FIG. 2 is a perspective view of the device 1.

Ferroelectric layer 6 has a wavelength converting portion E including a ridge type optical waveguide, groove-forming portions C and D provided in both sides of the wavelength converting portion E, respectively, and additional portions A and B provided in the outsides of the groove-forming portions, respectively. The groove-forming portion is thinner than the wavelength converting portion and additional portions. Grooves 6c and 6d are formed in the side of upper face. An upper side buffer layer 4A is formed on the surface 6a and a back side buffer layer 4B is formed on the back side of the ferroelectric layer. The ferroelectric layer 6 is adhered to a supporting body 2 through the buffer layer 4B and an adhesive layer 3. Besides, the back face of the ferroelectric layer means a main face of the layer in the side adhered to the supporting body. The upper face is a main face opposite to the back face.

According to the present example, upper side metal films 8A and 8B are formed on the upper faces 6a of the additional portions A and B, respectively, in the ferroelectric layer 6. Although each of the upper side metal films covers the additional portion in the vicinity of the groove, it does not cover the wall surface of the groove. The upper side buffer layer 4A is formed to cover the upper face 6a of the ferroelectric layer 6 and the upper side metal films 8A and 8B.

Further, the back side metal films 5A and 5B are formed on the back faces 6f of the additional portions A and B, respectively. Although each of the back side metal films cover the surface in the vicinity of the groove-forming portion C or D, it does not cover the back face of the groove-forming portion. The back side buffer layer 4B is provided to cover the back face 6f of the ferroelectric layer 6 and each of the back side metal films 5A and 5B.

Figure 3:
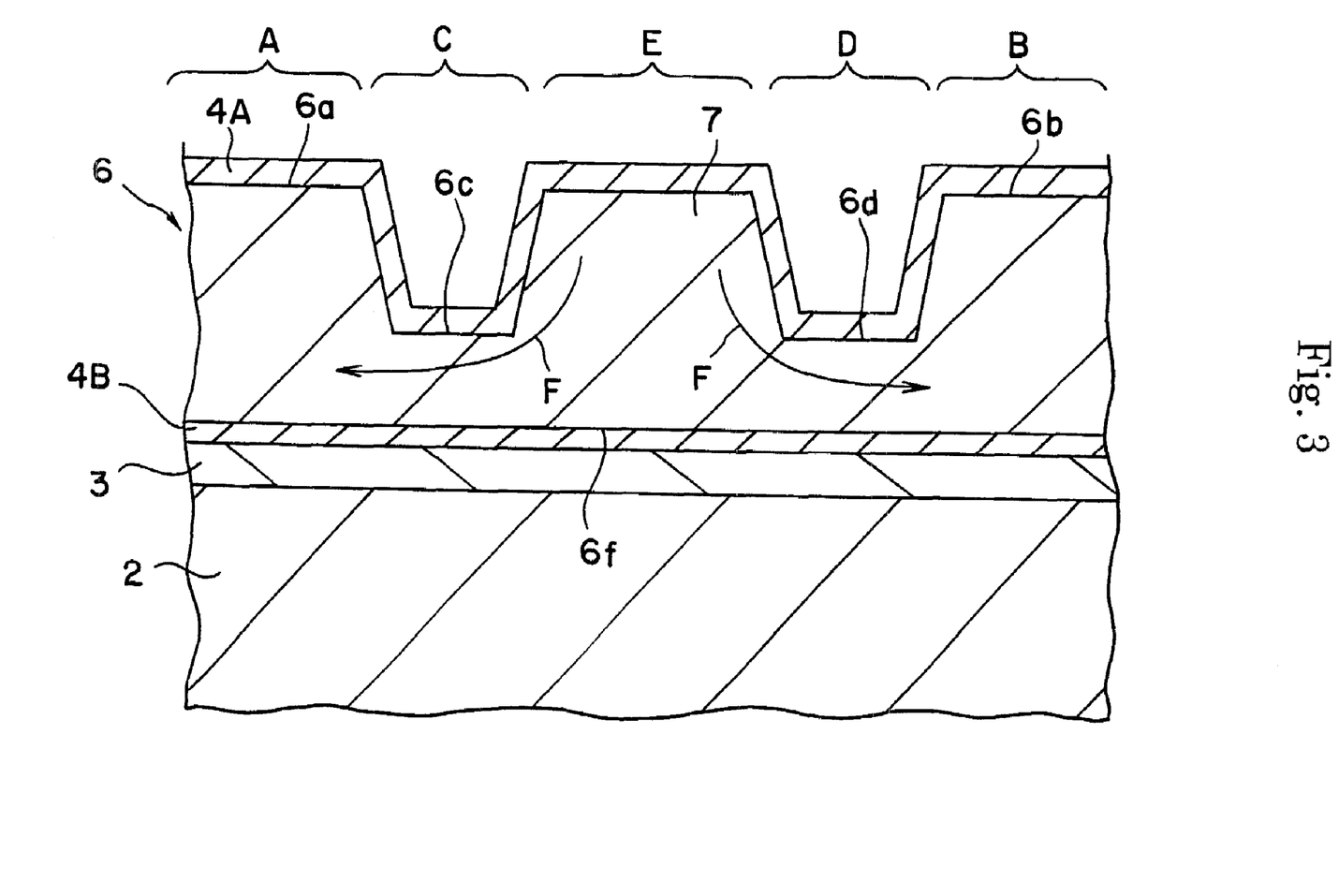
FIG. 3 is an enlarged cross sectional view showing a device according to a reference example.

In the case that the upper side and back side metal films are not present, for example as shown in FIG. 3, it was proved that leaked light F is not radiated into the substrate 2 and tends to be irradiated from the end faces of the ferroelectric layer 6 through slab portions A and B. This is caused by a large difference of refractive indices of the ferroelectric layer 6 and adhesive layer 3. Such high spatial frequency pattern overlaps the main beam. The removal and separation of the pattern is difficult, and the intensity of the main beam is considerably lowered after the separation and removal.

Figure 4:
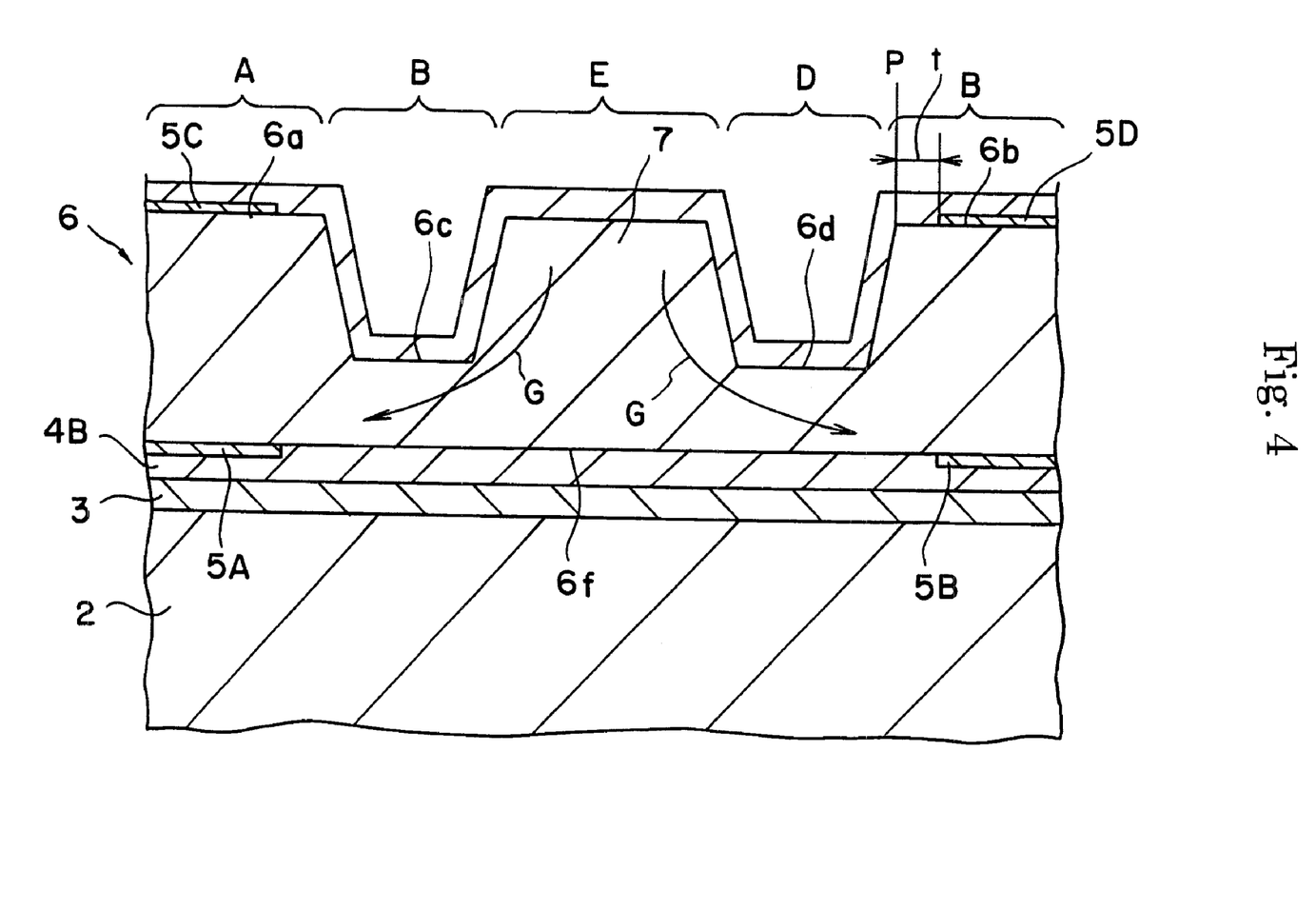
FIG. 4 is an enlarged cross sectional view showing the device according to the inventive example.

Contrary to this, according to the present invention, for example as shown in FIG. 4, light is leaked toward the slab portion as an arrow G. When the light passes the groove-forming portion, the light is absorbed by the metal films 5A, 5B, 5C and 5D so that the leakage of light is considerably reduced. It is thus possible to improve the quality of beam irradiating from the end faces and to improve the output power available for subsequent use.

Figure 5:
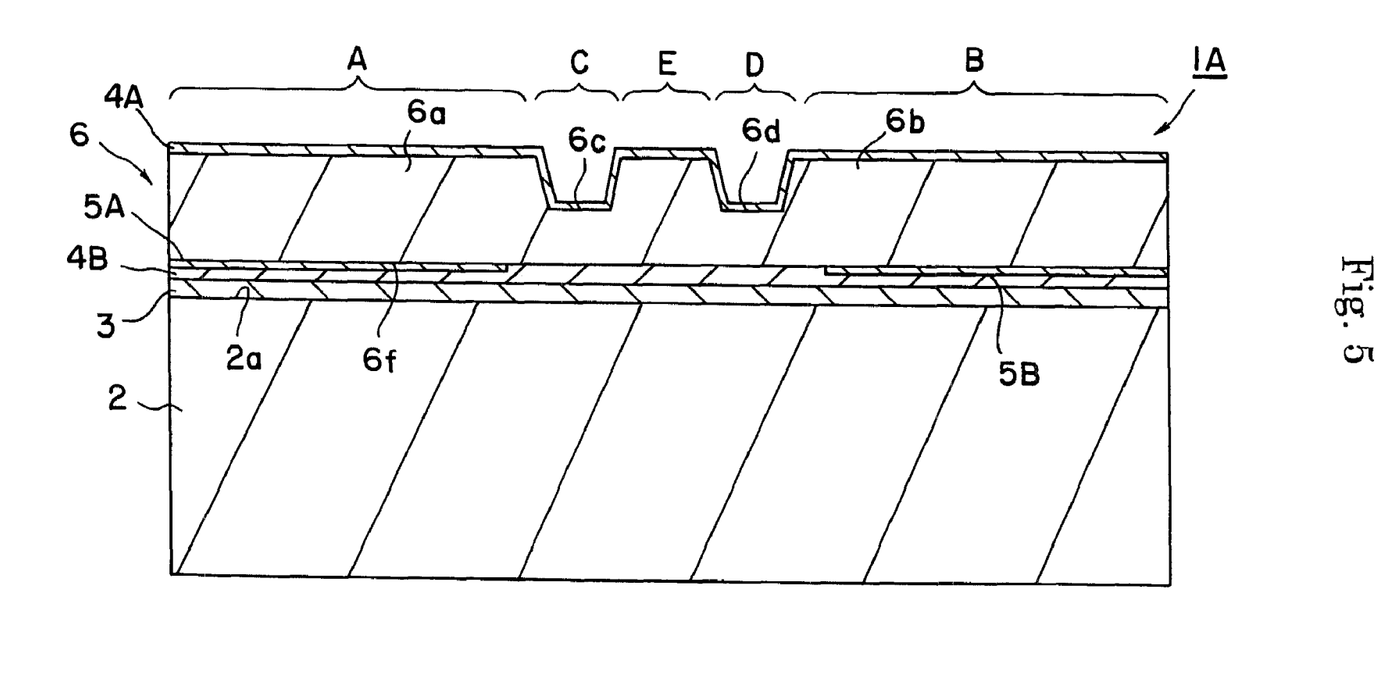
FIG. 5 is a cross sectional view showing a device 1A according to another embodiment of the present invention.

According to the present invention, the beam quality can be effectively and considerably improved by providing the metal film on at least one of the upper and lower sides of each additional portion. As shown in FIG. 5, however, the effects can be made still more considerable by providing at least the back side metal films 5A, 5B. More preferably, both of the upper and back side metal films are provided.

Figure 6:
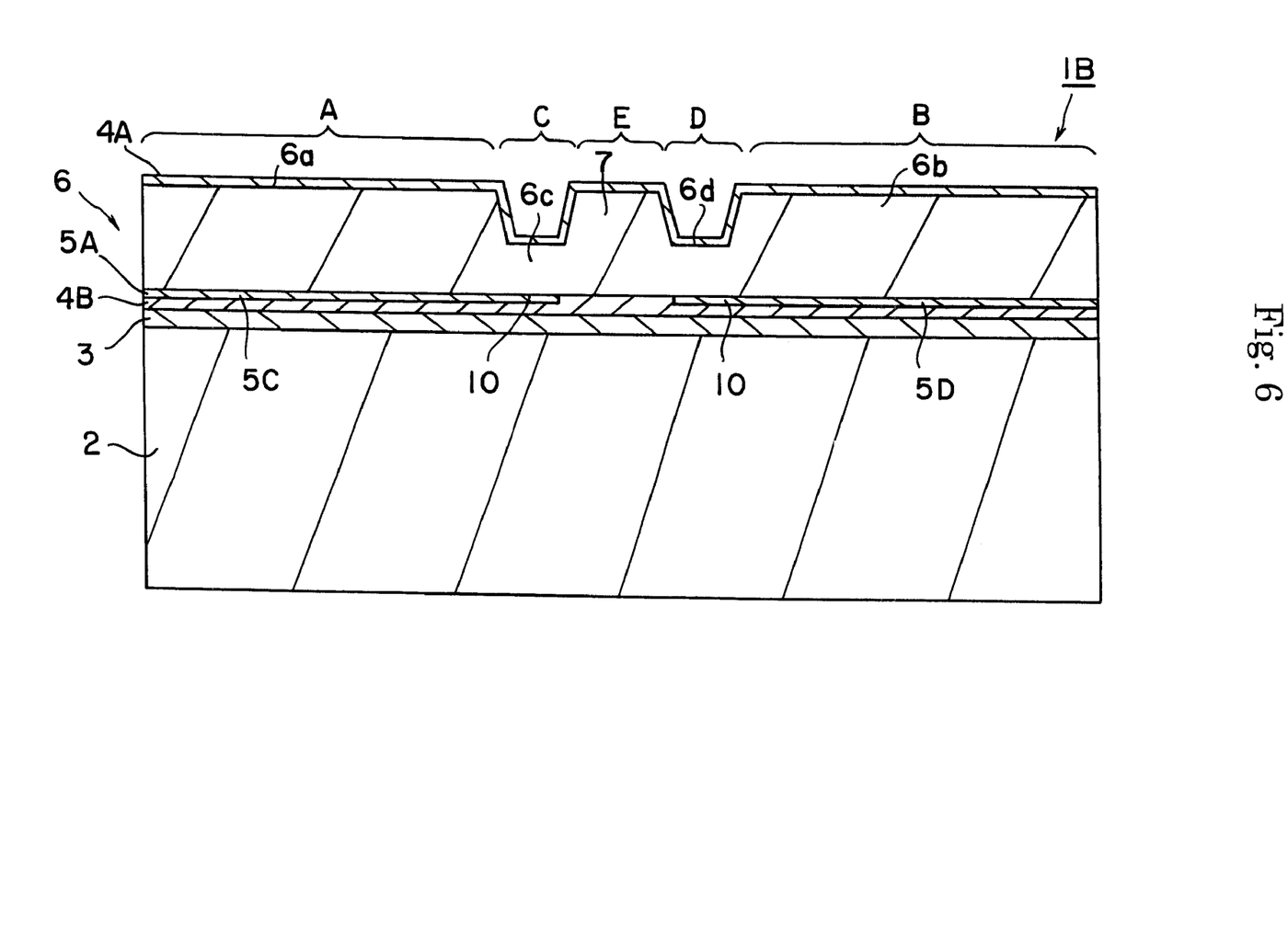
FIG. 6 is a cross sectional view showing a device 1B according to a still another embodiment of the present invention.

According to an example of FIG. 6, the back side metal films 5C and 5D cover the back faces of the groove-forming portions C and D as 10, respectively, as well as the back faces 6f of the additional portions A and B, respectively. The effect of preventing the leakage of light into the additional portion can be further improved.

Although the upper side and back side metal films may cover the whole upper face or whole back face of the additional portion, it is not required that the whole of each face is covered. It is provided that "t" is assigned to a distance between the end P of the groove and the surface side or back side metal film (FIG. 4) in horizontal direction, "t" may preferably be 50 µm or smaller and more preferably be 10 µm or smaller.

Further, according to the first and second inventions, the upper face and back face of the wavelength converting portion have not to be directly covered with the metal film. Further, the upper face of the groove-forming portion is preferably not covered with the metal film.

The means for converting wavelength in the wavelength converting portion is not particularly limited. According to a preferred embodiment, a periodic polarization domain inversion structure is formed in the wavelength converting portion to convert the wavelength of fundamental light to oscillate harmonic wave. The period of the periodic polarization domain inversion structure is changed depending on the wavelength. Further, although the method of forming the periodic polarization domain inversion structure is not particularly limited, electric field poling method is preferred.

Alternatively, a non-linear optical crystal, such as potassium lithium niobate, potassium lithium tantalate and potassium lithium niobate-potassium lithium tantalate solid solution, may be used to convert the wavelength of incident fundamental light to oscillate harmonic wave.

Although the material of the ferroelectric layer is not particularly limited as far as it is capable of modulating light, it includes lithium niobate, lithium tantalate, lithium niobate-lithium tantalate solid solution, potassium lithium niobate, KTP, GaAs, quartz and the like.

For improving the resistance of the ferroelectric single crystal against optical damage, the crystal may contain one or more metal element(s) selected from the group consisting of magnesium (Mg), zinc (Zn), scandium (Sc) and Indium (In). Magnesium is most preferred.

The ferroelectric single crystal may contain a rare earth element as a dopant. Such rare earth element functions as an additive for laser oscillation. Such rare earth element may preferably be Nd, Er, Tm, Ho, Dy or Pr.

The materials of the upper side and back side metal films are not particularly limited, and include gold, silver, copper, aluminum, titanium, molybdenum and tungsten.

The materials of the upper side and back side buffer layers include silicon oxide, magnesium fluoride, silicon nitride, alumina and tantalum pentoxide.

The material of the adhesive layer may be an inorganic adhesive, an organic adhesive or a combination of inorganic and organic adhesives.

Although specific examples of the organic adhesive is not particularly limited, it may be epoxy resin, a thermosetting resin adhesive, a ultraviolet curable resin adhesive, or "Alon ceramics C" (trade name: Supplied by Toa Gosei Co. Ltd.,) having a thermal expansion coefficient (thermal expansion coefficient of $13 \times 10^{-6}$/K) near that of an electro-optic single crystal such as lithium niobate.

Further, the inorganic adhesive may preferably have a low dielectric constant and an adhesive temperature (working temperature) of about 600° C. or lower. Further, it is preferable that a sufficiently high adhesive strength can be obtained during the processing. Specifically, it may preferably be a glass having a composition of one or plural elements of silicon oxide, lead oxide, aluminum oxide, magnesium oxide, calcium oxide, boron oxide or the like. Further, another inorganic adhesive includes, for example, tantalum pentoxide, titanium oxide, niobium pentoxide or zinc oxide.

The thickness of the upper side or back side metal film is not particularly limited. On the viewpoint of the present invention, the thickness of each metal film may preferably be 5 nm or larger and more preferably be 10 nm or larger. Further, although the upper limit of the thickness of each metal film is not particularly defined, it may preferably be 1 µm or smaller on a practical view.

The method of forming the upper side and back side metal films is not particularly limited, and includes sputtering, vapor deposition, plating or the like.

A method for forming the ridge type optical waveguide 7 in the ferroelectric layer is not limited, and includes machining, ion milling, dry etching, laser ablation or the like.

The material of the supporting body 2 is not particularly limited. According to a preferred embodiment, the minimum value of the thermal expansion coefficient of the supporting body 2 is ⅕ or larger of the minimum value of the thermal expansion coefficient of the ferroelectric layer 6, and the maximum value of the thermal expansion coefficient of the supporting body 2 is 5 times or smaller of the maximum value of the thermal expansion coefficient of the ferroelectric layer 6.

When each of the electro-optic materials forming the ferroelectric layer 6 and supporting body 2 has no anisotropy in thermal expansion coefficient, the minimum and maximum values of the thermal expansion coefficient are the same in each of the ferroelectric layer 6 and supporting body 2. When each of the electro-optic materials forming the ferroelectric layer 6 and supporting body 2 is anisotropic in thermal expansion coefficient, the thermal expansion coefficient may be changed for the respective axes. For example, in the case that the electro-optic material forming the ferroelectric layer 6 is lithium niobate, the thermal expansion coefficients for X axis and Y axis are $16 \times 10^{-6}$/° C., respectively, which is the maximum value. The thermal expansion coefficient in Z axis is $5 \times 10^{-6}$/° C., which is the minimum value. Therefore, the minimum value of the thermal expansion coefficient of the supporting body 2 is made $1 \times 10^{-6}$/° C. or larger, and the maximum value of the thermal expansion coefficient of the supporting body 2 is made $80 \times 10^{-6}$/° C. or smaller. For example, the thermal expansion coefficient of quartz glass is $0.5 \times 10^{-6}$/° C. and thus smaller than $1 \times 10^{-6}$/° C., for example.

On the above viewpoint, the minimum value of thermal expansion coefficient of the supporting body 2 may more preferably be ½ or larger of that of the ferroelectric layer 6. Further, the maximum value of thermal expansion coefficient of the supporting body 2 may more preferably be 2 times or smaller of the maximum value of that of the ferroelectric layer 6.

Specific examples of the material of the supporting body 2 are not particularly limited, as far as the above conditions are satisfied. It includes lithium niobate, lithium tantalate, a glass such as quartz glass, quartz, Si or the like. In this case, on the viewpoint of difference of thermal expansion coefficient, the materials of the ferroelectric layer and supporting body may preferably be the same and most preferably be lithium niobate single crystal.

EXAMPLES

Example 1

The device shown in FIG. 5 was produced. Specifically, periodic polarization domain inversion structure having a period of 6.50 µm was produced in a substrate having a thickness of 500 µm and made of MgO-doped lithium niobate. A metal film made of Al metal and having a thickness of 0.05 µm was formed thereon by sputtering. The metal film was subjected to dry etching with chlorine-series etching gas to form patterns of metal films 5A and 5B so that they are in the vicinity of the grooves for forming the optical waveguide. Thereafter, a $SiO_2$ film 4B (buffer layer) was formed by sputtering on the whole main face of the wafer to cover the patterns of the metal films 5A and 5B.

An adhesive 3 was applied onto a substrate 2 having a thickness of 1 mm and made of non-doped lithium niobate. The substrate was then adhered to the above substrate of MgO-doped lithium niobate. The surface of the substrate of MgO-doped lithium niobate was removed by grinding and polishing to a thickness of 3.7 µm. The substrate was then processed by laser ablation to form a ridge type optical waveguide 7. The width of the ridge type optical waveguide 7 was 4.5 µm and the depth was 2 µm. After the processing of the ridge, $Ta_2O_5$ film 4A (buffer layer) having a thickness of 0.5 µm was formed on the surface of the optical waveguide by sputtering. The wafer was then cut by a dicer to obtain chips each having a length of 12 mm and a width of 1.4 mm. Both end faces of the device were polished.

The optical properties of the waveguide were measured. The SHG output power was 15 W at an input power of 100 W of the fundamental light. The quality (M2 value) of beam of SHG light was measured with a beam profiler. A value of 1.1 was obtained as a result of a reduction of scattered SHG light beam irradiated from the slab portion. Further, the wavelength of the fundamental light was 1.06 µm in the optical waveguide and the wavelength of the SHG light was 0.53 µm. Further, the M2 value becomes 1.0 in the case of ideal Gaussian beam. As the profile of the beam is deteriorated, the value becomes larger.

Comparative Example 1

A device was produced according to the same procedure as the Example 1, except that the back side metal films were not formed. Periodic polarization domain inversion structure having a period of 6.50 µm was produced in a substrate having a thickness of 500 µm and made of MgO-doped lithium niobate. A $SiO_2$ film 4B (buffer layer) having a thickness of 0.5 µm was formed by sputtering. An adhesive 3 was applied onto a substrate having a thickness of 1 mm and made of non-doped lithium niobate. The substrate was then adhered to the above substrate of MgO-doped lithium niobate. The surface of the substrate of MgO-doped lithium niobate was removed by grinding and polishing to a thickness of 3.7 µm. The substrate was then processed by laser ablation to form a ridge type optical waveguide 7. The width of the ridge type optical waveguide 7 was 4.5 µm and the depth was 2 µm. After the processing of the ridge, $Ta_2O_5$ film 4A having a thickness of 0.5 µm was formed on the surface of the optical waveguide by sputtering. The wafer was then cut by a dicer to obtain chips each having a length of 12 mm and a width of 1.4 mm. Both end faces of the device were polished.

The optical properties of the waveguide were measured. The SHG output power was 15 W at an input power of 100 W of the fundamental light. The quality (M2 value) of beam of SHG light was measured with a beam profiler to obtain a value of 1.6. Besides, the wavelength of the fundamental light was 1.06 µm in the optical waveguide and the wavelength of the SHG light was 0.53 µm.

Example 2

A device was produced according to the same procedure as the Example 1, except that the back side metal films were not formed and only upper side metal films 8A and 8B were provided shown in FIG. 1. The optical properties of the waveguide were measured. The SHG output power was 15 W at an input power of 100 W of the fundamental light. The quality (M2 value) of beam of SHG light was measured with a beam profiler to obtain a value of 1.2. Besides, the wavelength of the fundamental light was 1.06 µm in the optical waveguide and the wavelength of the SHG light was 0.53 µm.

The invention claimed is:

1. A wavelength converting device comprising:
    a ferroelectric layer comprising a ferroelectric material, said ferroelectric layer comprising a wavelength converting portion comprising a ridge-type optical waveguide, additional portions provided in both sides of said wavelength converting portion, respectively, and groove-forming portions provided between said wavelength converting portion and said additional portions, respectively;
    a supporting body adhered to a back side of said ferroelectric layer; and
    a back side metal film covering at least a part of a back face of said additional portion, wherein said back side metal film does not cover a back face of said wavelength converting portion.

2. The wavelength converting device of claim 1, wherein at least a part of a back face of said groove-forming portion is covered with said back side metal film.

3. The wavelength converting device of claim 1, further comprising a back side buffer layer covering said back face of said ferroelectric layer and said back side metal film.

4. The wavelength converting device of claim 1, further comprising an upper side metal film covering at least a part of an upper face of said additional portion.

5. The wavelength converting device of claim 4, further comprising an upper side buffer layer covering a upper face of said additional portion and said upper side metal film.

6. A wavelength converting device comprising:
    a ferroelectric layer comprising a ferroelectric material, said ferroelectric layer comprising a wavelength converting portion comprising a ridge-type optical waveguide, additional portions provided in both sides of said wavelength converting portion, respectively, and groove-forming portions provided between said wavelength converting portion and said additional portions, respectively;
    a supporting body adhered to a back side of said ferroelectric layer; and
    an upper side metal film covering at least a part of an upper face of said additional portion, wherein said upper side metal film does not cover an upper face of said wavelength converting portion.

7. The wavelength converting device of claim 6, further comprising an upper side buffer layer covering an upper face of said ferroelectric layer and said upper side metal film.

8. The wavelength converting device of claim 6, further comprising a back side metal film covering at least a part of a back face of said additional portion.

9. The wavelength converting device of claim 8, wherein at least a part of a back face of said groove-forming portion is covered with said back side metal film.

10. The wavelength converting device of claim 9, further comprising a back side buffer layer covering a back face of said additional portion and said back side metal film.

* * * * *